US006024821A

United States Patent [19]

Cousineau

[11] Patent Number: 6,024,821

[45] Date of Patent: Feb. 15, 2000

[54] METHOD OF POSITIONING WALLPAPER BORDER

[75] Inventor: Pierre Cousineau, St. Eustache, Canada

[73] Assignee: International Wallcoverings Ltd., Brampton, Canada

[21] Appl. No.: 09/023,752

[22] Filed: Feb. 13, 1998

[30] Foreign Application Priority Data

Feb. 14, 1997 [CA] Canada .................................. 2197594

[51] Int. Cl.[7] .................................................. B32B 31/100

[52] U.S. Cl. ......................... 156/267; 156/304.7; 156/63; 156/71

[58] Field of Search ............................... 156/63, 71, 267, 156/304.7

[56] References Cited

U.S. PATENT DOCUMENTS 4,018,260 4/1977 Baslow .
4,053,008 10/1977 Baslow .
5,410,813 5/1995 Carlson .
5,743,485 4/1998 Martorelli et al. .

*Primary Examiner*—Deborah Jones
*Assistant Examiner*—Jason Resnick
*Attorney, Agent, or Firm*—Fredrikson & Byron, P.A.

[57] ABSTRACT

A method of positioning two strips of a wallpaper border in a non-aligned abutting relationship on a continuous surface is disclosed, in which an end of a first strip of the wallpaper border is positioned in an abutting relationship with an end of a second strip of the wallpaper border and in which the strips are at a pre-determined angle. The wallpaper is wallpaper having a dominant design feature. The method comprises placing a clear plastic sheet over the end of the first strip of wallpaper border and marking a line on the clear plastic sheet that contours around the dominant design feature on the wallpaper. The clear plastic sheet is positioned at the predetermined angle over the second strip of wallpaper border such that the line contours around the dominant design feature on the second strip of wallpaper border. The clear plastic sheet and end of the second strip are then re-positioned over the end of the first strip of wallpaper border and the first strip, second strip and clear plastic sheet are cut simultaneously along the line.

7 Claims, 4 Drawing Sheets

METHOD OF POSITIONING WALLPAPER BORDER

FIELD OF THE INVENTION

The present invention relates to a method of positioning wallpaper, and in particular, a method of positioning strips of wallpaper border in an abutting relationship at a pre-determined angle, especially 90°. In particular, the invention relates to the matching and abutting of two pieces of wallpaper in the form of a border at an angle such that the pattern on the two pieces of wallpaper is matched in an acceptable manner.

BACKGROUND TO THE INVENTION

Wallpaper may be applied to a surface e.g. a wall in a wide varieties of ways. Typically, wallpaper is applied to the entire wall surface and frequently to all or most of the wall surfaces in a room. However, wallpaper may also be applied to a surface in the form of a border. For instance, a border may be applied to or adjacent to the ceiling, or at another location, and in a continuous manner around all or part of a room. In other circumstances, wallpaper in the form of a border may be applied around more than one edge of a wall surface, around windows or other objects in the wall such that the strips of the border of the wallpaper are placed at a angle to each other. The most common angle is a right angle i.e. 90°, but other angles could be used depending on the circumstances. The wall surface could be a flat surface but it could also have a curved surface e.g. cylindrical, such as a column or other curved surface.

Wallpaper comes in a wide variety of designs, and wallpaper used in the form of borders is particularly likely to have a bold pattern. As an example, the wallpaper of the border might be a floral pattern, having large designs of flowers interspersed with leaves or other less prominent flowers. As used herein, wallpaper having a bold pattern, as exemplified by flowers and leaves in which the flowers are the visually dominant feature, is referred to as wallpaper having a dominant design feature.

If two strips of a wallpaper border are to be placed at an angle to each other, an aesthetic or other acceptable match of the two pieces of wallpaper can be obtained relatively readily if the pattern on the wallpaper is subtle e.g. does not have a large dominant feature. However if the wallpaper does have a dominant feature, it is preferable that the abutting strips of the wallpaper border meet in an aesthetically acceptable manner.

Thus, the person hanging the wallpaper i.e. hanging the strips of wallpaper border, is faced with the task of matching the two strips of wallpaper border and moreover cutting the two strips of wallpaper border in a manner that results in an acceptable abutment of the two strips of wallpaper border, including with no gaps between the two pieces of wallpaper border. This may not be readily achieved, even by persons with skill in the hanging of wallpaper.

SUMMARY OF THE INVENTION

A method has now been found for the positioning of two strips of wallpaper border in a non-aligned abutting relationship in a manner that is conducive to matching the patterns on the wallpaper border in an acceptable manner.

Accordingly, the present invention provides a method of positioning two strips of a wallpaper border in a non-aligned abutting relationship on a continuous surface, in which an end of a first strip of the wallpaper border is positioned in an abutting relationship with an end of a second strip of the wallpaper border and in which said strips of wallpaper border are at a pre-determined angle, said wallpaper having a dominant design feature, comprising:

a) placing a clear plastic sheet over the end of the first strip of wallpaper border;

b) marking a line on said clear plastic sheet, said line contouring around said dominant design feature on said wallpaper;

c) positioning said clear plastic sheet at said predetermined angle over said second strip of wallpaper border such that said line contours around said dominant design feature on said second strip of wallpaper border;

d) positioning said clear plastic sheet and said end of the second strip over said end of the first strip of wallpaper border such that said sheet is re-located in the position of step (a), said end of the second strip being maintained spatially with respect to said clear plastic sheet in the position of step (c); and e) simultaneously cutting said first strip, said second strip and said clear plastic sheet along said line, preferably using a sharp knife.

In a preferred embodiment of the method of the present invention, the first and second strips of wallpaper border are in a 90° relationship relative to each another.

In a further embodiment, the clear plastic sheet is a peelable sheet, capable of being applied to said wallpaper and peeled therefrom.

In a further embodiment, the wallpaper has interconnected areas between said dominant design feature that have less dominant design features.

In yet another embodiment, the clear plastic sheet may be marked with a black marker.

BRIEF DESCRIPTION OF THE DRAWINGS

The present invention is illustrated by the embodiments shown in the drawings, in which.

DETAILED DESCRIPTION OF THE INVENTION

Figure 1:
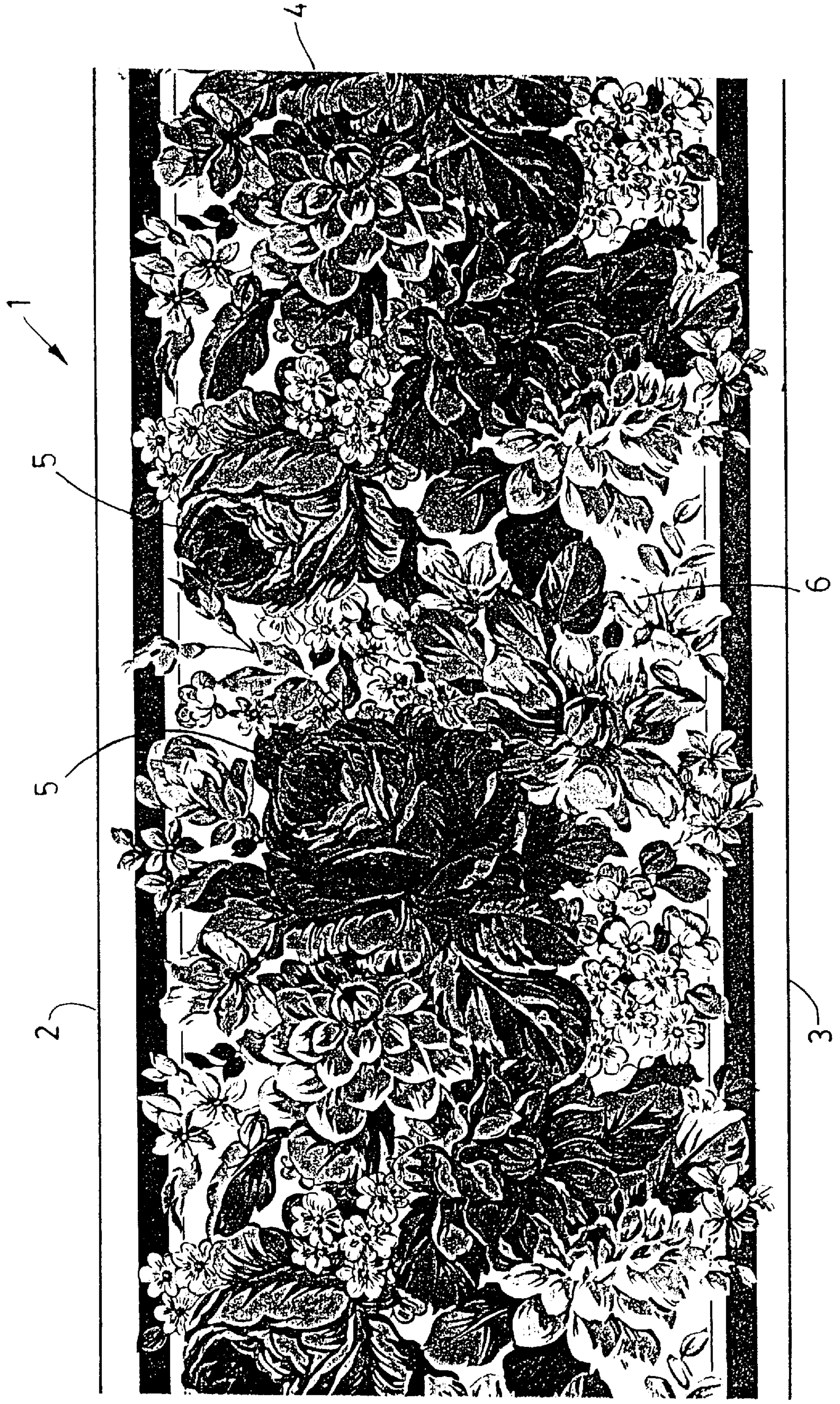
FIG. 1 is a schematic representation of an end of a first strip of wallpaper border.

FIG. 1 shows a first strip of wallpaper border, generally indicated by 1. First strip 1 has side edges 2 and 3 as well as an end edge 4. End edge 4 is shown as being essentially perpendicular to side edges 2 and 3, but this is not necessary. The wallpaper of first strip 1 is shown as having a plurality of dominant designs, in this instance roses, interspersed with areas that do not have a dominant feature. It is understood that the wallpaper may be any wallpaper having a dominant design and a less dominant design. In the wallpaper shown in the drawings, the roses were dark pink, with both dark green leaves and light-coloured flowers in the areas between the roses.

Figure 2:
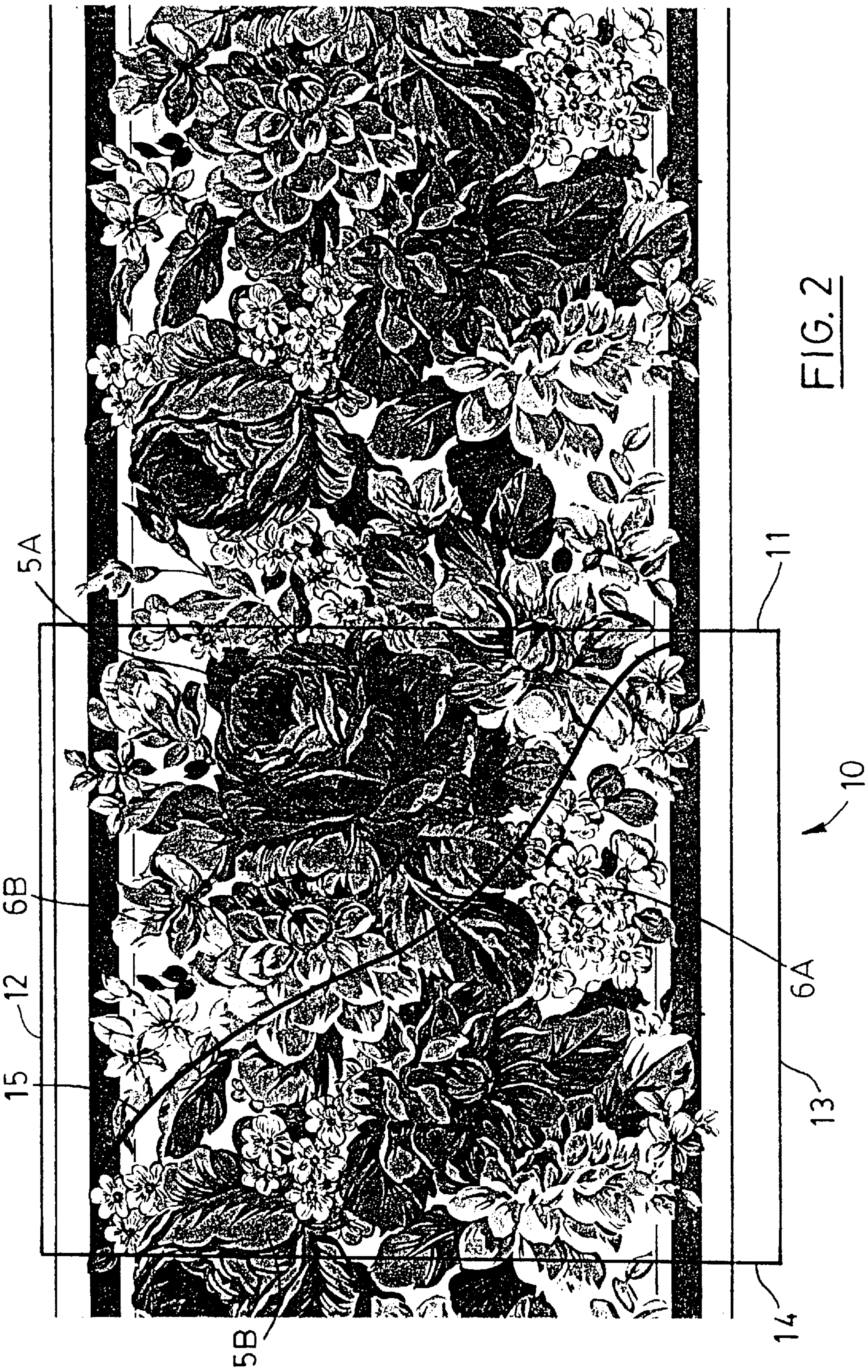
FIG. 2 is a schematic representation of the wallpaper of FIG. 1 showing a clear plastic sheet thereon.

FIG. 2 shows first strip 1 of FIG. 1 having a clear plastic sheet of film, 10, superimposed thereon. Plastic sheet 10, which may also be referred to as a template, is shown as having edges 11, 12, 13 and 14 and has been placed over the end of first strip 1. The location of clear plastic sheet 10 may be varied, depending on the particular design on the wallpaper and the nature of the end of the wallpaper border. If first strip 1 was intended to be located in an abutting relationship with a ceiling or other surface along its edge 2, then it is understood that edge 12 of sheet 10 would be aligned with edge 2 of first strip 1, assuming edge 2 is the edge in abutting relationship. This will facilitate the subsequent cutting step if the cutting step is to be carried out with the wallpaper border in place on the wall, as is normal practice, especially if the wallpaper border is abutting an edge of the wall e.g. the ceiling or a side wall. Sheet 10 is shown as having line 15 marked thereon that passes around the dominant design 5A and 5B in a contouring manner so that it does not intersect either of design 5A or 5B. Line 15 separates the less dominant area 6 into areas 6A and 6B.

Figure 3:
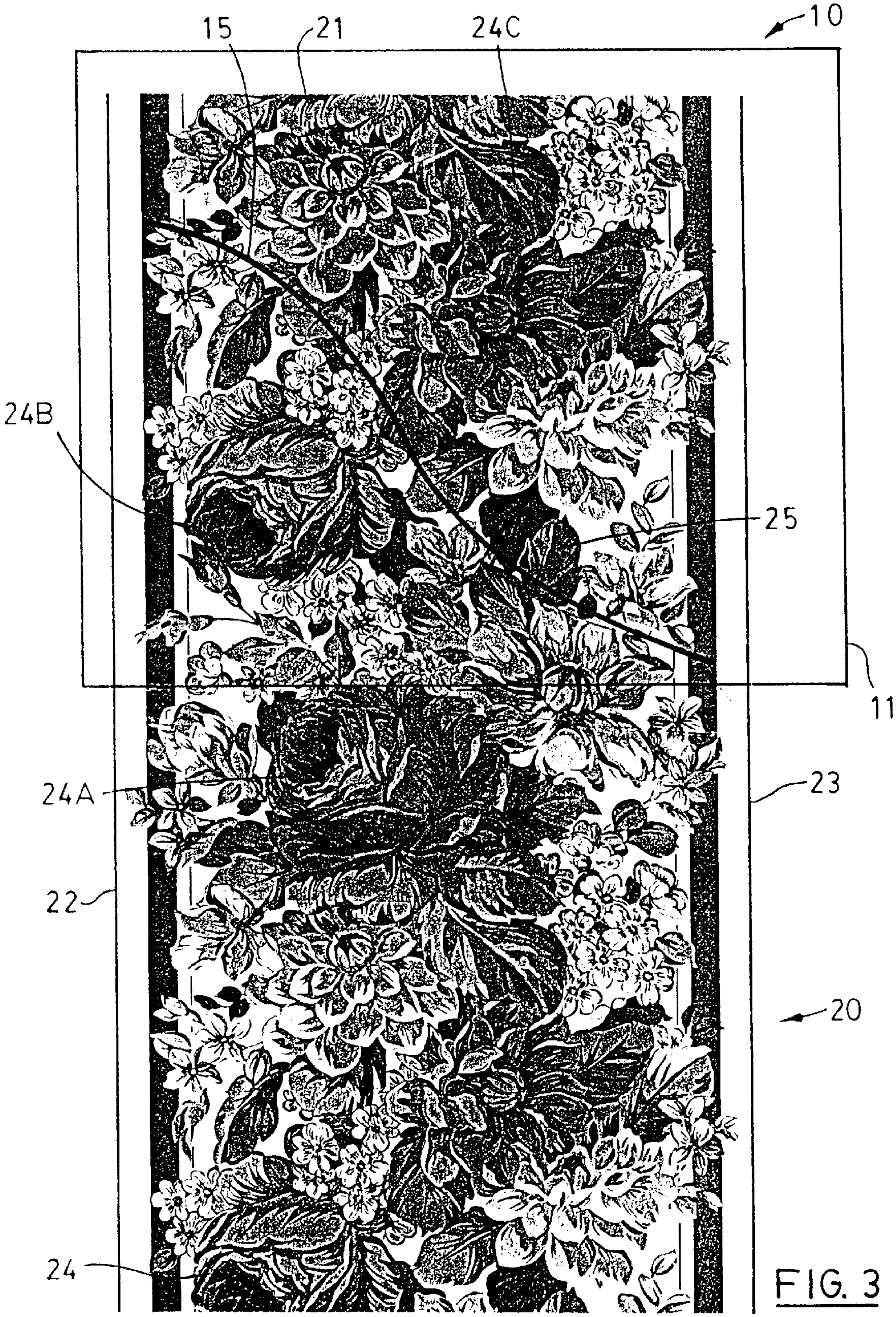
FIG. 3 is a schematic representation of the end of a second strip of wallpaper border showing the clear plastic sheet thereon.

FIG. 3 shows sheet 10 relocated on the second strip of wallpaper border, generally indicated by 20. Second strip 20 has end edge 21 and side edges 22 and 23. Sheet 10 is shown as being superimposed on second strip 20 with line 15 being placed so that it does not overlay any of the dominant designs, indicated by 24, on second strip 20. In particular, in the embodiment illustrated, line 15 passes to the same side of dominant features 24A and 24B and to the opposite side of dominant feature 24C on second strip 20. In doing so, it passes through the area 25 of the less dominant feature.

Figure 4:
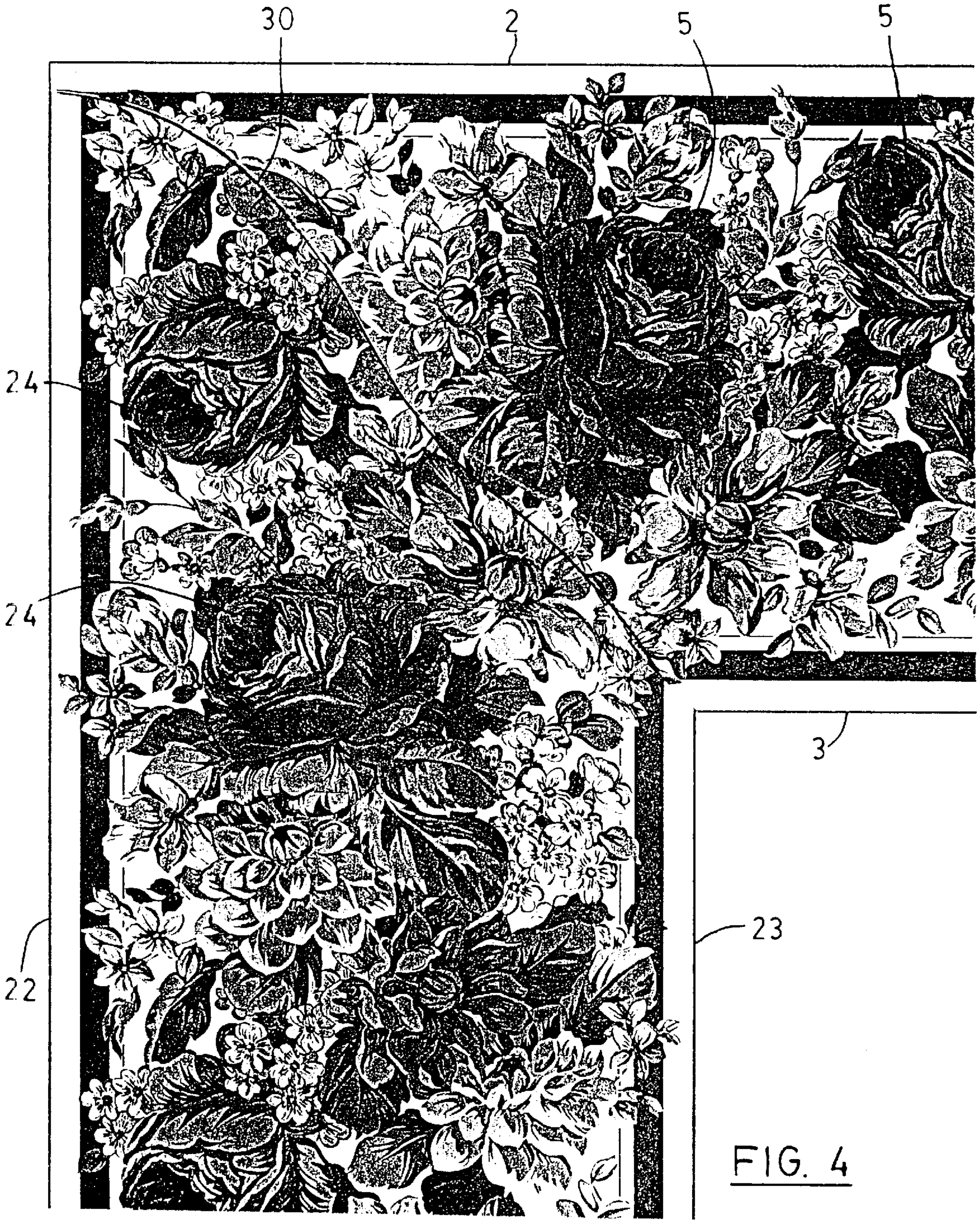
FIG. 4 is a schematic representation of the first strip and second strip in an abutting relationship.

FIG. 4 shows the strips of wallpaper 1 and 20 after having been superimposed, together with sheet 10 i.e. sheet 10 and second strip 20 have been re-located on first strip 1 such that (i) sheet 10 is spatially relocated in the position on strip 1 when the contoured line was marked on sheet 10, and (ii) sheet 10 and strip 20 remain spatially located in the selected position. In addition, sheet 10 has been sliced along line 15 e.g. using a sharp knife, and sheet 10 and the pieces of strip 1 and strip 20 that have been cut off have been removed from the superimposed sheets. Thus, line 30 is the abutting intersection between first strip 1 and second strip 20. The abutted strips show the design features 5 and 24 not being intersected by the abutting line 30 and representing a good match between first strip 1 and second strip 20.

In operation of the method of the present invention, sheet 10 is placed over the end of first strip 1. First strip 1 would normally be already pasted on to a wall or other surface. As will be understood by persons skilled in the art, it would be difficult and likely impractical to attempt to position and especially cut the wallpaper border prior to pasting on a surface in view of the difficulties of obtaining an acceptable alignment of the cut edges of the wallpaper border. The nature of the placement of sheet 10 on first strip 1 will depend in part on the particular location of strip 1. A line, 15, is then drawn on sheet 10 in the manner that intersects less dominant features on the wallpaper border. The location of such a line will depend in particular on the pattern of the wallpaper border. In some circumstances, it might be possible to draw more than one line on the clear plastic sheet, and to select the most appropriate one after the repositioning of the clear plastic sheet on second strip 20.

Sheet 10 is then removed from first strip 1 and located on second strip 20, being positioned such that line 15 similarly passes between the dominant features, 24. Sheet 10 would need to be moved and/or carefully placed so as to be positioned on a selected area of second strip 20 to again pass through less dominant sections of the pattern on the wallpaper.

The clear plastic sheet would normally be placed with one edge aligned with an edge of the first strip of wallpaper border and a corner located at the end of the first strip. A mark or notch may be placed on an opposed edge of the clear plastic sheet, so as to enable the clear plastic sheet to be relocated on the second strip in the proper alignment i.e. to keep the sheet on the second strip at the proper "angle".

Second strip 20 with sheet 10 attached thereto is then relocated on first strip 1. Sheet 10 is then sliced along line 15, with first strip 1 and second strip 20 similarly and preferably simultaneously being sliced to effect a smooth complimentary cut on first strip 1 and second strip 20. The wallpaper and clear plastic sheet may conveniently be cut with a sharp knife. The two parts of sheet 10 and the extraneous end portions of strips 1 and 20 are then removed, thereby leaving the two strips of the wallpaper border at the required angle with the strips being in an abutting relationship with an acceptable match of the pattern of the wallpaper border.

In preferred embodiments of the invention, the strips of wallpaper border are at an angle of 90° to each other, although any other angle may be selected.

The plastic sheet is a clear plastic sheet, having sufficient clarity such the dominant pattern may be seen through the sheet. In preferred embodiments, the sheet has a pressure sensitive adhesive, such that the sheet may be applied to the second strip of wallpaper and remain there until cut, but may be subsequently peeled from the wallpaper without visible damage to the wallpaper. The sheet is capable of being written on e.g. with a black marker, so that the line may be drawn on the sheet.

The wallpaper border has a dominant design feature. Between the dominant design feature, the wallpaper border needs to have less dominant features, which could range from a plain background to a design that is less dominant. The difference in design between the dominant feature and less dominant feature might be pattern or colour, or any combination thereof. For instance, the paper might have a pattern of roses on leaves in which the dominant pattern is the roses.

The wallpaper border would normally be pasted on the wall before being cut.

The present invention provides a method of matching pieces of wallpaper border that is flexible in application, as well as being simple and quick to use.

I claim:

1. A method of positioning two strips of a wallpaper border in a non-aligned abutting relationship on a continuous surface, in which an end of a first strip of the wallpaper border is positioned in an abutting relationship with an end of a second strip of the wallpaper border and in which said strips of wallpaper border are at an angle, said wallpaper having a dominant design feature, comprising:

a) placing a clear plastic sheet over the end of the first strip of wallpaper border;

b) marking a line on said clear plastic sheet, said line contouring around said dominant design feature on said wallpaper;

c) positioning said clear plastic sheet at said angle over said second strip of wallpaper border such that said line contours around said dominant design feature on said second strip of wallpaper border;

d) positioning said clear plastic sheet and said end of the second strip over said end of the first strip of wallpaper border such that said sheet is re-located in the position of step (a), said end of the second strip being maintained spatially with respect to said clear plastic sheet in the position of step (c); and e) simultaneously cutting said first strip, said second strip and said clear plastic sheet along said line.

2. The method of claim 1 in which the first and second strips of wallpaper border are in a 90° relationship relative to each another.

3. The method of claim 2 in which the clear plastic sheet is a peelable sheet, said peelable sheet being capable of being applied to said wallpaper border and peeled therefrom.

4. The method of claim 3 in which said sheet and said second end are adhered together in step (d), and said sheet is peeled off said wallpaper border after being cut in step (e).

5. The method of claim 3 in which the clear plastic sheet is marked with a black marker.

6. The method of claim 3 in which, in step (e), said strips of said clear plastic sheet are cut with a sharp knife.

7. The method of claim 3 in which step (e) is carried out with said strips of wallpaper border pasted on said continuous surface.

* * * * *